May 7, 1940.  W. W. FLINCHUM  2,199,950
PISTON
Filed Feb. 1, 1937
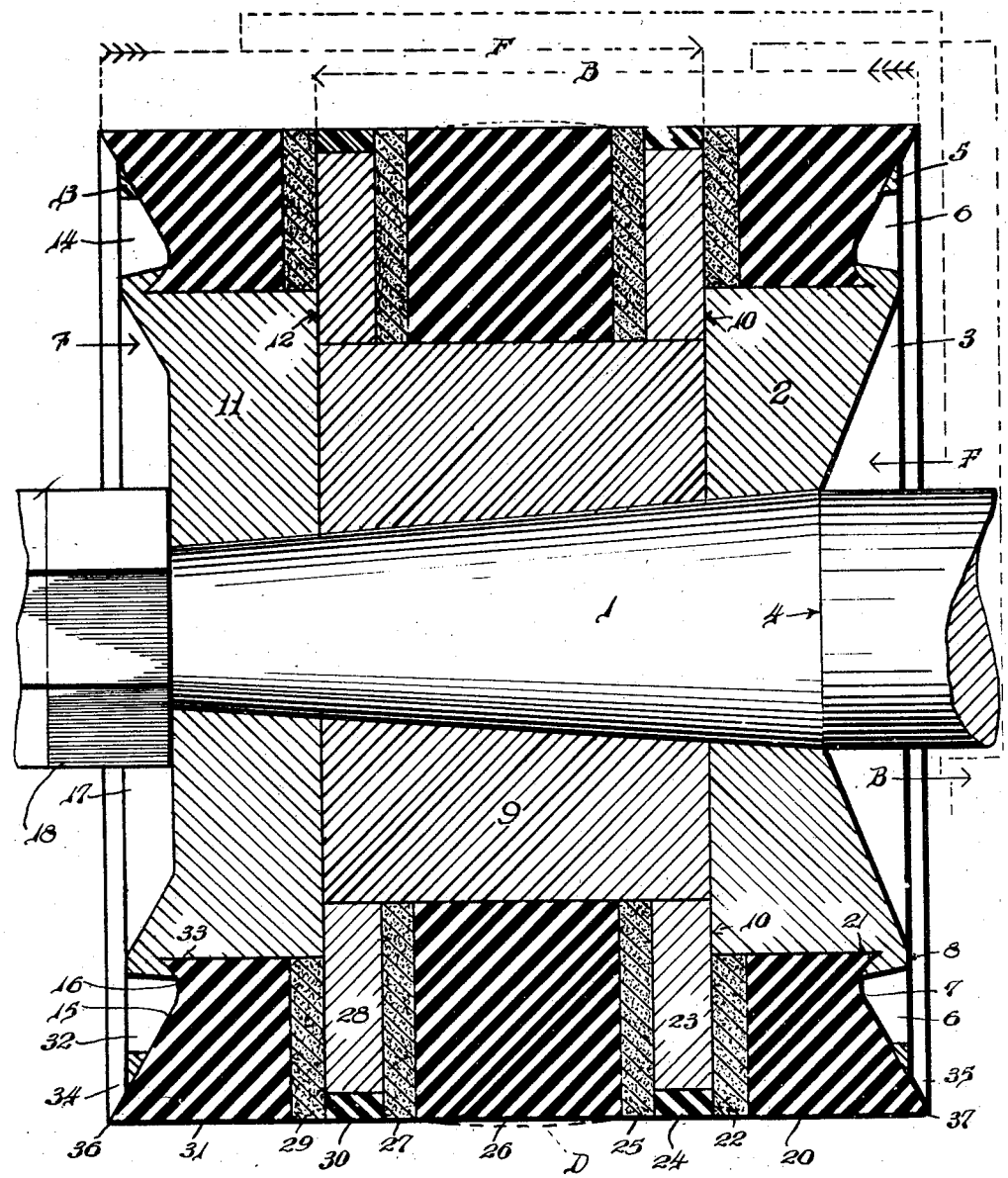
INVENTOR.
William Weldon Flinchum Patented May 7, 1940

2,199,950

UNITED STATES PATENT OFFICE 2,199,950

PISTON

William Weldon Flinchum, Oklahoma City, Okla.

Application February 1, 1937, Serial No. 123,550

5 Claims. (Cl. 309—7)

This invention relates to a piston, of a composite type, and particularly one wherein the elements thereof are full floating and so associated that they may be removed, as a composite unit, from the mandrel upon which they are placed, and wherein certain of the rings of the piston, during each stroke, are protected against pressure under which other rings are moving. The invention also comprehends an association of elements, that will furnish the desired amount of resistance to flow in either direction on movement of the piston and between it and the wall of the cylinder and the wall of the mandrel. This will insure a maximum amount of impact and pressure upon the fluid column during the movement of the piston for the purpose of establishing a continuous and non-leaking fluid flow as piston moves.

Within the purview of the invention, it is designed to so relate the parts that each will be interdependent, and each of them to independently develop a pressure outwardly to the cylinder wall; inwardly to the mandrel wall, and against each other.

It is also an object of the invention to under cut the faces of certain elements of the piston in arcuation, as to both increase the reception of pressure and distribute that pressure over the arcuate faces of these elements to prevent the intrusion of sand between them and the wall of the cylinder and the mandrel.

In this connection, it is an object of the invention to permit the pressure against the arcuated facings to provide a seal of such faced elements against the bearing surfaces to which they bear during each piston stroke.

It is also an important object of the invention, to support the aforesaid element with relation to a purposely formed mandrel adapted to assume a pressure which ultimately induces a seal against leakage between the piston and the shell or cylinder, as well as between the piston and the mandrel.

It is also an important object of the invention to provide a structure which will not only function as stated, but which can be quickly assembled, and, in which the various parts are so associated, that the function of one part will be dependent upon another part and cause a unified function of the parts.

With the above in view, an embodiment of the invention is disclosed on the accompanying sheet of drawings, forming a part of the specification.

In this drawing, a view comprehensive in detail, sets forth the embodiment aforesaid.

Upon a tapering spindle 1 is applied a head 2 having a dished portion 3 the seat whereof registers with the breast 4 of the spindle 1. This head is provided with a radially and angularly extending flange 5, provided with sand outlets 6, and the inner side of this flange is arcuated at 7 to form a seat 8, against which dual pressure of one of the elements will be applied.

From the head 2 proceeds a mandrel 9 of lesser dimension than the head 2, and between these parts there is formed a shoulder 10.

Against the free end of the mandrel 9 is placed a second head 11 corresponding to the head 2 and forms a second shoulder 12 between it and the mandrel and this head is also formed into a flaring flange 13 having sand outlet 14 and an inner arcuated face 15 terminating in a seat 16 against which one of the elements will impinge.

Into the dished portion 17 and upon the spindle 1 is placed the nut 18 for holding the parts together and upon the spindle 1, held against anti-clockwise movement by a jamb nut 19.

Prior to the application of head 11 on the spindle 1 a resilient ring 20 is placed on the body of the ring 2 which has an arcuated face corresponding to the arcuated face of the flange 5, and also has a lip-edge 21 which is forced into the seat 8. This not only provides for the prevention of sand passing between the ring 20 and the face of the head 2, which passes out through the sand outlets 6 but, as will appear, will also provide a base from which pressure may be transmitted to the periphery of the ring 20.

Upon the body of the head 2, and in juxtaposition with the rear face of the ring 20 is a fabric ring 22 which on one face is substantially in alignment with the vertical side of the head 2 at the shoulder 10, and provides a wall against which rests a metallic ring 23 of lesser diameter than the ring 22, so as to permit the application of a resilient band 24 to its periphery. To the face of this metallic ring 23 is applied another fabric ring 25 which also rests upon the body of the mandrel 9.

Next is applied a resilient piston ring 26 of considerable width and forming a central cushion.

There is now applied against this cushion a fabric ring 27, a metallic ring 28 and a fabric ring 29, like the rings 25, 23 and 22 likewise applied, and the metallic ring 28 being of lesser diameter than the rings 27 and 29 allows for a resilient band 30 to be applied to its periphery.

Next is applied a ring 31 similar to ring 20, and this ring is provided with an arcuated face 32 terminating in a flange 33 which finds its place in the seat 16 in the flange 14. This arrangement, as previously stated will prevent both the passage of the sand to and between this ring 31 and the head 11, and also provide a base for transmission of stress from this ring to the periphery of the ring 31.

The cross-sectional area of the rings 20 and 31 is sufficient to permit the perimeters of these rings to overhang the flanges 5 and 14 to form pressure receiving pockets 34 and 35 which force beaks 36 and 37 out against the wall of the cylinder when pressure is developed during the operation of the piston. This prevents rosebudding, by the outward radial pressure of these beaks against the wall of the cylinder, will form an actual seal and also prevent the sand pick-up at these points from scoring the lining of the cylinder. These beaks will also force the pressure from the pressure-receiving pockets, and will be transmitted in opposite directions from 35 to the shoulder 12, and from 34 to the shoulder 10 axially.

Normally, all of the peripheries of the elements of the piston are in alignment with each other when not under pressure. When, however, upon movement of the piston in reversed directions, for instance, as indicated at arrows B and F, each of the elements of the piston will yield both to displacement through axial movement and also to flexure radially during the axial movements of each part of the composite structure.

For instance, assuming a piston stroke to be in the direction of the arrow F, the flange 34 will assume the pressure in correspondence with the reverse pressure arrow F and transmit it axially through 31, 39, 36, 37, 26, 25 and 23 to and against the shoulder 10, which can be seen by the diagrammatic directional lines above the figure on the drawing.

When the pressure is exerted, the metallic rings 28 will move away from the shoulder 13, and force the metallic ring 23 against the shoulders 10, and this holds the pressure from elements 20 and 31 in either direction. During this pressure transmission of each element from 34 through to 10, each one of the elements has a relative radial flexure developing an outward pressure of each of them against the lining of the cylinder. However, in the majority of them, this pressure will be in proportion to the cross-sectional area of each resilient element. The resilient element 26 having the greater cross-sectional area will develop a radial arc as at D that will form during the periods of pressure transmission, in either direction upon reciprocating the piston.

Contrawise, the piston stroke B will develop pressure from B, and transmit it from 35 to 12 through 20, 22, 23, 25, 26, 27 and 28 in a similar way and with similar results as just explained.

During each stroke all of the piston rings will move in a direction opposed to the direction of the stroke, except during one stroke, 23 will be stopped by impinging shoulder 10, and during the other stroke, ring 28 will be estopped by impingement with shoulder 12. This permits all of the pressure from 36 to be exerted against 10 protecting 22 and 20 and 37 from that pressure, while in reverse the pressure at 37 only reaches to 12, and thus protects 29, 31 and 36, from pressure. This allows the parts to which pressure is not being applied to move under no resistance, and thus increase the life of the piston, as can now readily be seen.

As soon as the pressure transmission in either direction is complete, then the displacement of each element forces its periphery out away from the centre, and against the wall of the cylinder.

By the movement axially of the metallic rings 23 and 28, by the pressure developed at the radial flanges either 36 or 37, the side walls of each element will be forced one against the other, and prevent separation which would tend to weaken not only the structure but the elements thereof. This will also so substantially unify the behaviour of the elements, as to vulcanize them one to the other by the heat generated during reciprocation, so that the piston, as such is removable as a unit from the spindle 1.

The transmission of the resilient, as well as the resisting elements, forcing radial expansion under given pressures provides an efficient piston and seal which will meet the needs of a device of this character.

For the purpose of providing means for the escape of the sand from between the inner walls of the flanges 5 and 13 and the rings 20 and 31, the openings 6 and 13 may be so shaped and their centres directed in such a way, that sand may be ejected when it accumulates between the flanges and the rings.

It is also to be remembered, that, if desired, the fabric rings 22 and 29 may be omitted, and the rings 20 and 31 may be widened so that their faces of rings 20 and 31 may bear against the metallic rings 23 and 28, since the pressure from the beaks 36 and 37 is alternately and finally transmitted to the opposite metallic rings, as for instance, from 36 to 28 or from 37 to 23, which, as aforesaid, will arc the member 26 as seen at D.

It will now be seen that there is provided a piston having a composite body of associated rings the two outer pressure receiving rings whereof are provided with arcuated faces to form arcuated rims that find lodgement in a like arcuated seat in each radial flange, and the seating of these rims will not only provide a seal against sand leakage into and between the rings and the heads 2 and 11, but will also provide for a base of stress transmission from the base or arcuate rim point through the cross-sectional area of the rings and finally over to the opposed metallic rings which rest against their respective shoulders to receive the pressure and hold it, and thus produce an arc virtually in each one of the perimeters of the various flexible rings.

It is a question purely of behaviour and assembly, whether or not it shall be expedient to place the rings in juxtaposition one to the other on the heads and the mandrel and simply allow each ring to have an interdependent and relative behaviour during the operation of the piston, or it may be, that for stress-transmissional purposes, it shall be expedient to vulcanize these rings into solidarity. Both of the considerations are contemplated in the exercise of this invention.

Since the pressure or stress transmission is designed to primarily affect the perimeter-movement of the rings, in their arcing as expressed, the bands 24 and 30 surrounding the metallic rings 20 and 28 will contribute their transmitting efficiency from 22 and 25 and from 27 and 29 as the stress is delivered from 37 to 10 and from 36 to 12.

It is to be especially noticed that the arrangement provided gives to the piston a perimeter alignment which is only changed or modified when pressure is applied in either direction from F or B and this will not only balance the piston in the cylinder, but will protect the life of the elements.

The arcuated faces of the flanges 5 and 13 forming the seats 8 and 16, as they do, will also cause the pressure from 36 and 37 to flow into the seats, and prevent bulging of the rings 20 and 31 into the openings 6 and 13.

Having thus set forth the invention, I claim:

1. In a piston, the combination with a mandrel having an opening to receive a piston-rod, of a head diametrically larger than the mandrel and forming between the head and mandrel a pressure-receiving shoulder, a second head adapted to be placed on the mandrel and forming a second pressure receiving shoulder, means to hold said second head to the mandrel, plural rings mounted upon each head, and means co-operating with said shoulders for preventing pressure from reaching the plural rings alternately during piston strokes, intermediately disposed rings movably mounted between the pressure preventative means, said intermediately disposed rings being of fabric and highly resilient material.

2. In a piston, the combination with a mandrel, having an axial opening to receive a piston-rod, of a head on said piston rod and diametrically larger than the mandrel, a pressure abutment between said mandrel and said head, a flange with an inner and an outer face angular to the axis of the mandrel, a like second head adapted to be applied to the mandrel, a like flange for said second head, a pressure abutment between the mandrel and the said second head, means to hold the portable head to the mandrel, plural rings mounted on each head, metallic rings mounted on the mandrel and adapted alternately to co-operate with the pressure abutments to protect alternately the plural rings against pressure, an intermediate highly resilient ring floatable upon the mandrel, and fabric rings between the highly resilient and the metallic rings.

3. In a piston, the combination with a mandrel having an axial opening to receive the spindle of a piston-rod, of a head diametrically larger than the mandrel and forming between the head and mandrel a pressure-receiving abutment at an angle to the axis of the head and mandrel, a said head removable from the mandrel, a pressure-receiving abutment between said second head and the mandrel, means to secure the head to the mandrel, plural rings on each head, metallic rings on the mandrel of cross-sectional size greater than the plural rings, an intermediately disposed highly resilient ring of greater cross-sectional dimension than and of the rings, fabric rings between the intermediately disposed highly resilient ring and the metallic rings, and pressure receiving beaks carried by one ring on each head and which overhangs the outer faces of each head, and means carried by each head for supporting the beaked ring on each head, said means being provided with means to release sand deposits between the said rings and means, when the rings float from the supporting means.

4. In a piston, the combination with a mandrel having an axial opening for the reception of a spindle of a piston rod, of an enlarged head integral therewith, of a pressure abutment at an angle to the axis of the mandrel and an abutment at the mandrel and the head, a second head, a second pressure abutment at an angle to the axis of the mandrel and an abutment at the mandrel and the head, resilient and fabric rings on each head, a flange on each head for holding the resilient rings, beaks carried by the resilient rings, and overhanging the flange, metallic rings mountable and movable upon the body of the mandrel, intermediate rings between the metallic rings for transmitting pressure from one metallic ring to the other alternately, and resilient rings mounted upon the metallic rings to form a continuous elongated surface for the piston.

5. In a piston, the combination with a mandrel having an elongated axial opening to receive the spindle of a piston rod, of a head placed on said spindle, an outwardly extended flange on said head and having sand emission openings, a second head adapted to be placed on the spindle and against the end of the mandrel, means to hold said second head to the mandrel, floating rings on each head, floating pressure receiving rings on the mandrel, pressure receiving abutments between each head and the mandrel, and with which alternately the pressure receiving rings co-operate, an enlarged resilient ring between the pressure receiving rings, fabric rings between the pressure receiving rings and the resilient ring, each pressure receiving ring holding the pressure from the head floating rings, alternately from one head floating ring while pressure is upon the other head floating ring.

WILLIAM WELDON FLINCHUM.